April 28, 1931.  M. HANDSCHIEGL  1,802,944
METHOD AND APPARATUS FOR TRICK MOTION PICTURE FILM PRODUCTION
Filed April 26, 1926  2 Sheets-Sheet 1
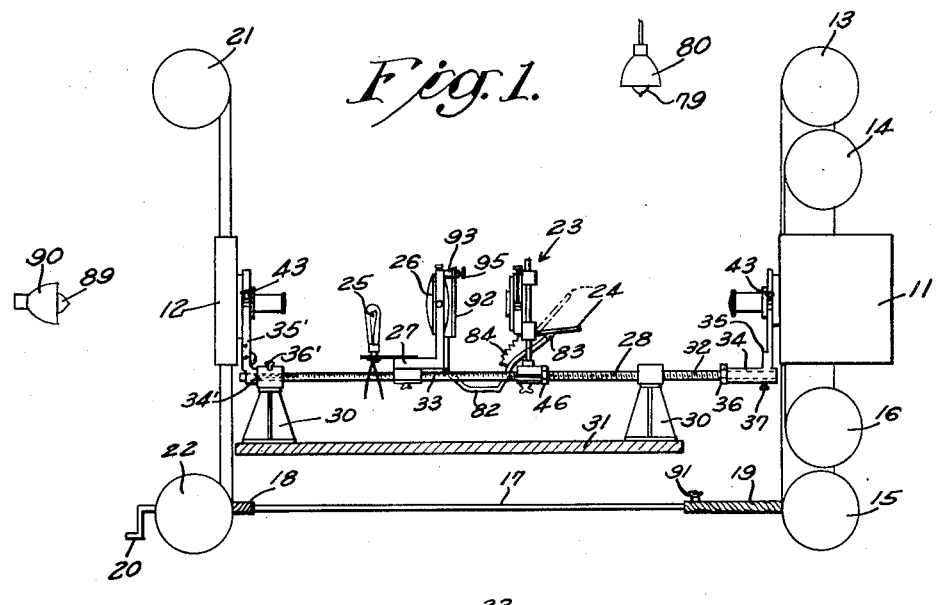
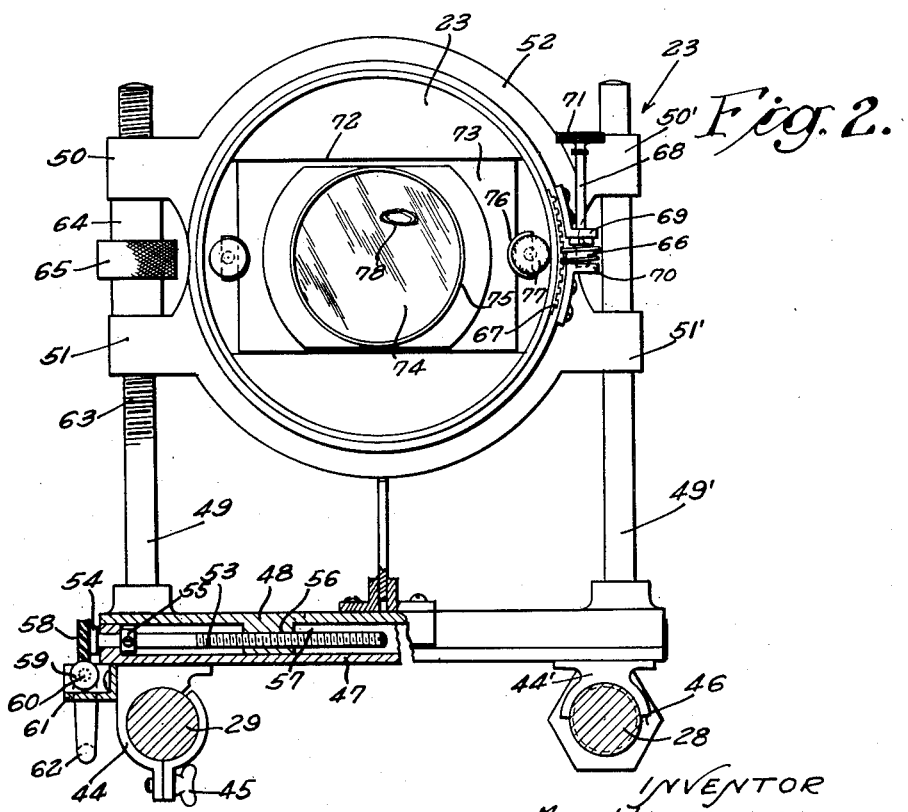
INVENTOR
MAX HANDSCHIEGL
By Frank L. A. Graham
ATTORNEY April 28, 1931.     M. HANDSCHIEGL     1,802,944
METHOD AND APPARATUS FOR TRICK MOTION PICTURE FILM PRODUCTION
Filed April 26, 1926     2 Sheets-Sheet 2
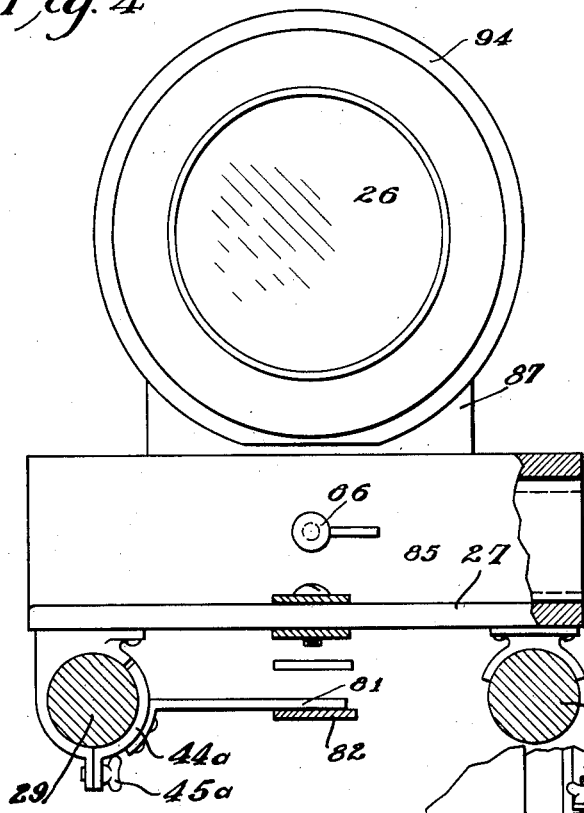
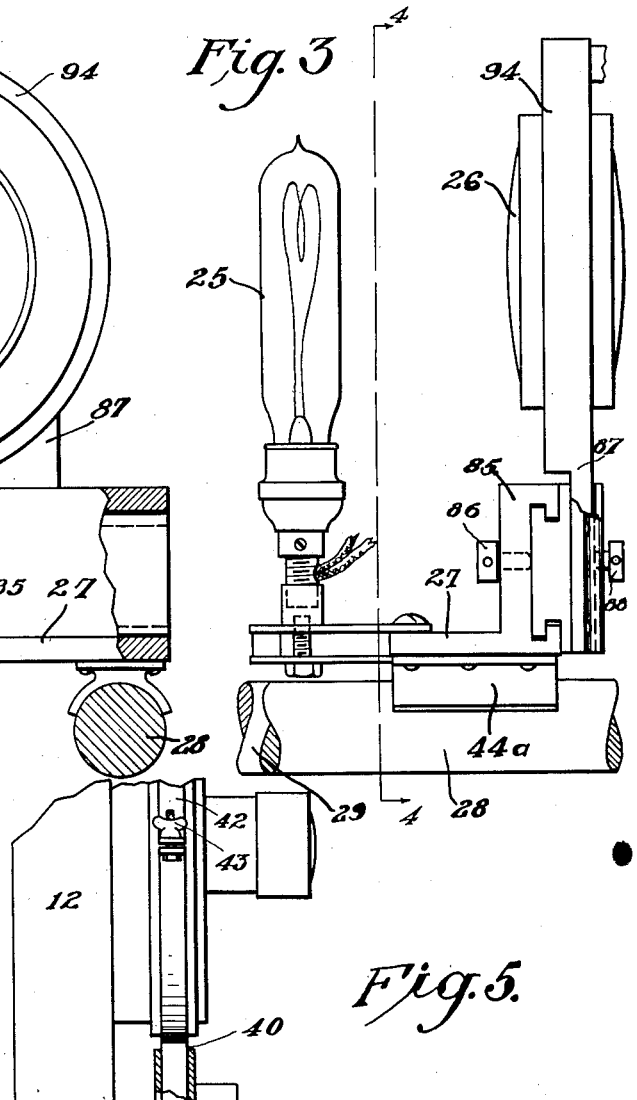
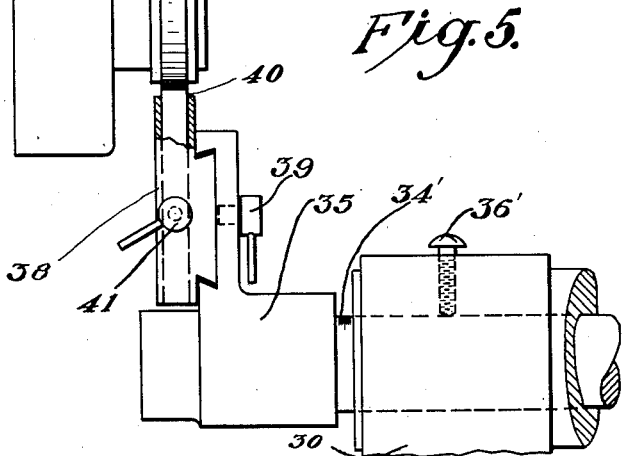
INVENTOR
MAX HANDSCHIEGL
By
ATTORNEY Patented Apr. 28, 1931

1,802,944

UNITED STATES PATENT OFFICE

MAX HANDSCHIEGL, OF HOLLYWOOD, CALIFORNIA, ASSIGNOR TO BESSIE HAND-SCHIEGL, OF LOS ANGELES, CALIFORNIA

METHOD AND APPARATUS FOR TRICK MOTION-PICTURE-FILM PRODUCTION

Application filed April 26, 1926. Serial No. 104,792.

Although my present invention is entitled as referring to apparatus for trick film production, it should be understood that this invention includes not only apparatus but also methods in which the said apparatus may be used; and that the apparatus includes parts which are suitable for various alternative uses,—and also certain parts which are adapted to be rapidly shifted, either manually or automatically, from positions of use to positions of disuse; and preferred embodiments of my invention may include oppositely disposed motion picture camera parts spaced apart and movable relatively to one another upon parallel and substantially horizontal rods, or the like,—these rods being, in turn, supported by frame elements of any preferred character, and used for the support of various auxiliary parts, as hereinafter described.

It is an object of this invention to provide means for so supporting and adjusting (1) a complete motion picture camera (and preferably a camera which is provided with means for advancing together two films, placed in contact) and (2) what I may term a skeleton or finding camera, disposed opposite said complete camera and provided with film handling means, but not necessarily provided with a complete box or a shutter,—the construction and relationships between the mentioned cameras being such that both of them may be made to focus upon the same intermediate plane or object.

The object referred to may be, for example, a single "frame" of film, as a frame bearing some desired supplemental or trick representation (as a representation of a halo) whose image is to be added, in the same or in varying positions, upon the successive frames of an exposed but undeveloped film, or upon an unexposed or "raw" sensitized film,—as during the advance of such a film through said complete camera synchronously with the advance of a corresponding print (or a mat film) through the mentioned skeleton camera; and my novel apparatus may, if desired, include not only suitable means for supporting the mentioned cameras in carefully adjusted opposite relationships, but also means for synchronizing the advance of the negative or sensitized film through the complete camera with the advance of the corresponding print or mat through the mentioned skeleton camera; and optionally also means permitting rotation of said frame, and rotation of one or both of said cameras,—as upon an optical axis common to said cameras and to any desired lenses, color screens, reflectors, "frame" holders, or the like, disposed therebetween.

Various methods having heretofore been proposed,—as in my copending applications Serial No. 610,334, filed January 2nd, 1923, and Serial No. 59,587, filed September 30th, 1925, (upon which, however, the practice of my present invention is not dependent) for the simultaneous production and subsequent use of a plurality of identical negatives,—one of these negatives being used, for example, after the taking of a first "action", upon both negatives, in the production of a "mat" suitable for use in the protection of corresponding areas in the other (undeveloped) film during the impressing of a second "action" (as, a desired background or picture or halo) thereon,—it is an object of my present invention to provide an organization capable of utilizing, in the production of a trick negative, a plurality of films which have been simultaneously light-impressed in the general manner referred to; and, for this purpose, my invention may include a complete camera which is equipped with means for causing a harmonious advance of a developed negative or other mat and an undeveloped negative (which may have been previously exposed in the general manner referred to) this mentioned complete camera being associated with means,—including the mentioned skeleton camera (placed opposite the same and provided with means for synchronously handling a corresponding print or mat) and one or more sources of illumination, interposable lenses, one or more interposable reflectors, one or more interposable screens, and a special "frame" holder, provided with one or more means of precise adjustment,—to enable a worker first to adjust a "frame" (carrying a feature which is to be added on the undeveloped or raw film)

to a desired position, and then to impress said feature on said undeveloped or raw film,—proceeding thus, step by step, throughout the entire film strip, or throughout any desired portion thereof.

As indicated, it is an object of my invention to provide a pair of oppositely disposed cameras with means for precisely adjusting the distance of the same from an interposed frame holder and, in preferred embodiments of my invention, this frame holder may be associated with a lens; and a movable support for said "frame" and said lens may have pivoted thereto a mirror, adapted to reflect a beam of light from a laterally-disposed source through said frame,—to project an image of any object painted (or otherwise provided) thereon, upon a print film which is advancing through the mentioned skeleton or finding camera. This mirror may be shiftable between an operative position (reflecting, in the manner described) and an inoperative position; and it may be automatically movable to the latter position, as for the momentary exposing of the film in the mentioned complete camera, incidentally to the bringing of an additional light source, associated with an additional lens (and optionally also with a color screen or screens) pivotally into position in front of the mentioned complete or two-film camera.

Other objects and modes of use of my invention,—including a mode in which a mat film is advanced through the mentioned skeleton camera and in which means are provided for projecting a beam of light therethrough toward a "frame" carrying a picture (the mentioned complete camera being then utilized synchroneously to advance an undeveloped but previously exposed film)—may be best understood from the following description of an illustrative apparatus, and alternative modes of using the same, taken in connection with the appended claims and the accompanying drawings, in which Fig. 1 may be regarded as a diagrammatic elevational view, schematically illustrating one embodiment of my invention.

Fig. 2 is a detail view showing a frame holder provided with means for adjusting a "frame" in three different ways, relatively to a carriage therefor.

Fig. 3 is an additional detail view, showing in elevation a lens holder associated with a source of illumination and additional parts, and mounted in such manner as to permit various adjustments and a pivotal movement, as hereinafter described.

Fig. 4 is an elevational view of the lens and lens holder shown in Fig. 3, this view being taken substantially as indicated by the line 4—4 of Fig. 3.

Fig. 5 is a detail view taken near the left end of Fig. 1, and showing means for so supporting a skeleton or finding camera as to permit various adjustments thereof, as hereinafter described.

Referring to the details of that specific embodiment of my invention chosen for purposes of illustration, 11 and 12 may be oppositely disposed cameras, containing identical or different lens systems, intended to be adjustable to a coaxial relationship, and each provided with means for the handling of motion picture films, to advance the same step by step. The mentioned film-handling means may comprise usual sprockets and Geneva movements, details thereof being omitted as well known; and one of these cameras, as that shown at the right, Fig. 1, may be a complete camera,—provided with a usual shutter (not shown) and preferably provided also with means permitting the concurrent step-by-step advance of a plurality of films (as from reel housings 13 and 14 toward reel housings 15 and 16)—one of these films, when two are advanced in contact, being a sensitized but undeveloped film (which may bear latent images produced, for example, as described in my mentioned prior applications) and the other of said films being, in the case assumed, a developed negative or other mat film. The opposite "camera" 12, whose film-handling mechanism may be operatively connected with that of the camera 11 (as by a shaft 17, shown as provided with worms 18 and 19 respectively adapted to engage worm gears (not shown) and to be rotated by means such as a crank 20) may be a mere skeleton or finding camera,—adapted to carry and to render visible any pictures upon a print or mat film advanced, as from a reel holder 21 toward a reel holder 22, synchronously with the advance of the raw or other film handled by the camera 11; and between the mentioned cameras I may interpose a "frame" holder 23, shown as adjustable longitudinally on parallel rods or parts serving also for the support of the mentioned cameras 11 and 12.

Assuming the lens systems of the two mentioned cameras to be identical, the same may be positioned, by any suitable adjusting means, at substantially the same distance on opposite sides of a "frame" displaying a feature (as, for example, a background) which is to be added to the undeveloped film handled by the camera 11; and the film synchronously advancing through the camera 12 may be, for example, a print obtained from a corresponding developed negative (such as a "mat" negative disposed in contact with the mentioned undeveloped film, and advancing therewith through the camera 11) and in order to ascertain and vary the apparent position of the feature or features to be added, by the use of the selected frame, to the mentioned undeveloped film (as during its advance from within reel housing 14 toward reel housing 16) I may provide the "frame" holder 23, or its equivalent, not only with means for the precise adjustment of said holder, or the frame supported thereby, but also with means for the projection of suitable beams of light alternately through said frame (1) in the direction of the skeleton camera 12, as by means of a movable mirror 24, and (2) in an opposite direction, into the camera 11, as by means of an incandescent or other light 25, shown as associated with a lens 26 (which may be adapted to render the rays from said light substantially parallel) upon a carriage 27. This carriage, if used, may have a lateral pivotal movement relatively to one of the mentioned parallel rods or bars 28, 29,—by which all of the mentioned elements may be supported.

The rods or bars 28 and 29, shown as extending horizontally, may be supported in any suitable way, as by means of a frame or elevated base or by means of brackets 30, shown as resting upon a horizontal plate 31; and either one or both of the mentioned cameras, or the "frame" holder 23 may be provided not only with means for a precise adjustment of the relative distances between the mentioned elements, as for the focusing of the respective cameras upon a frame supported by the film holder 23, but also with means permitting a rotative adjustment of one or more of said cameras or said frame. For example, one or both of the rods or bars 28, 29, may be provided with screw threads or graduations,—a portion of the rod or bar 28 to the right of the center thereof being shown as threaded, and a portion to the left of the center thereof being shown, at 33, as provided with graduations. Assuming only one end of the mentioned horizontal supporting bars or rods to be threaded, the other bar or rod (or both of said bars or rods) may accurately fit within a sleeve or sleeves 34, shown as integral with bracket fitting 35, for the support of the camera 11; and the threaded rod (28) may be provided with a nut or nuts 36, engaging a companion sleeve, also integral with the bracket fitting 35, one of said sleeves being preferably provided with means, such as a set screw 37, for the retention of the fitting 35, and thereby the camera 11, in any position to which it may be adjusted by means such as the nut or nuts 36.

Although substantially identical means may be used for the support of both of the mentioned cameras, I show the camera 12 as supported by means of rods 34', rigidly connected with an angle bracket 35', said rods being adapted very accurately to interfit within tubular terminal portions of the rods or bars 28, 29, and being adjustably retained therein by any suitable means, such as set screws 36',—shown as extending through brackets 30. Whether or not identical camera supporting means are employed at opposite ends of the rods 28, 29, or their equivalents, one or both of the mentioned cameras may advantageously be provided with additional adjusting means of the character best shown in Fig. 5, a transversely and horizontally slidable member 38 being shown as provided with a clamp 39, and a vertically slidable member 40 being shown as provided with a clamp 41; and one or both of the mentioned cameras, may, if desired, be rotatively adjustable about an optical axis common to both of said cameras,—as within circular straps 42 shown as provided with clamps 43.

Assuming the optical systems of the respective cameras 11 and 12 to be identical, the frame holder 23 (see Figs. 1 and 2) may occupy a substantially central position therebetween; and it may be adjustable longitudinally of the rods or bars 28, 29, as by simply sliding or tapping a guide member 44, shown as surrounding the rod 29 and as provided with a clamping screw 45 or (assuming the screw 45 to be turned to a releasing position) by means such as a nut 46, shown as engaging a threaded portion of the rod or tube 28; and the guide 44, and optionally also an additional guide 44' engaging the rod 28, may be integrally or otherwise rigidly connected with a horizontal member 47, supporting a transversely movable carriage 48, shown as provided with vertical posts 49, 49',—the former of these being shown as threaded and both being shown as engageable by, and serving for vertical guidance of, projections 50, 51 and 50', 51', upon a circular support 52,—within which the mentioned frame holder 23 is shown as rotatably mounted.

In order to impart transverse horizontal movement to the carriage 48, and thereby to a frame within the frame holder 23, I may employ means such as a screw 53,—shown as held, by collars 54 and 55, against longitudinal movement, but as adapted to impart movement to said carriage by engagement with a lug 56, projecting therefrom into a channel 57, containing said screw; and the outer end of said screw may be provided with, for example, a worm gear 58, rotatable by a worm 59,—whose shaft 60 may extend through a bearing bracket or brackets 61 and may be provided with a manually manipulable crank 62, or its equivalent. Although one of the posts 49, 49' may advantageously be smooth and adapted accurately to interfit within the mentioned lugs upon the circular support 52, the other post, as the post 49, may advantageously be threaded, as at 63, to cooperate with a correspondingly threaded adjusting nut 64, shown as interfitting between the lugs 50 and 51 and as carrying a milled collar 65, to facilitate its rotation. By this means, or by equivalent means, the frame holder 23, or its equivalent, may be very accurately adjusted in a vertical direction; and I may employ means such as a worm 66, engaging a worm gear 67 upon the frame holder 23 and provided with a shaft 68 extending through bearing lugs 69 and 70 upon the circular support 52 to impart any desired rotative adjustment to the frame holder 23,—as by the manipulation of a milled head 71 upon one end of the shaft 68. The frame holder 23, although circular in outline, may be provided with a rectangular depression 72, adapted to receive a frame-retaining plate 73, provided with a lens 74 (shown as retained within a flanged tube 75). Removably to secure plate 73, the frame holder 23 may be provided with turn buttons rotatable by milled heads 77 and shown as having bearings in said holder—which may be provided with an aperture approximately corresponding in outline with lens 74. In the bottom of the mentioned depression, corresponding in outline with plate 73, I may, if desired, insert a glass or other transparent member adapted either directly to carry a feature (as a halo 78) to be added on the mentioned undeveloped film in camera 11 or to be used in the holding of a celluloid or other frame carrying a feature in a plane at right angles to the optical axis of lens 74,—which may be identical with the optical axis of the optical system of camera 11, camera 12, or both cameras 11 and 12.

In order to be able to project a beam of light momentarily through a frame held in the general manner described—to produce an image of a feature or features shown thereon (whether produced photographically or otherwise) upon a film (as a print or mat film) in the skeleton camera 12, or its equivalent,—to afford guidance in the adjustment of the mentioned feature or features with reference to this film, and thereby with reference to the correspondingly advanced and positioned undeveloped film in camera 11—I may employ means such as an elevated or otherwise laterally disposed light 79 (shown as provided with a parabolic reflector 80) used in conjunction with the mirror 24; and, in order to render the positioning of the light 25 (with or without the lens 26—which may be employed to converge rays from light 25 toward the lens 74) subsequently effective in automatically removing the mirror 24, or its equivalent, to an inoperative position (out of the path of a beam projected from the light 25 through the mentioned frame—to light-impress any feature or features 78 upon the undeveloped film in camera 11) I may provide the carriage 27, by which the light 25 and the lens 26 may be pivotally supported (as by the aid of a guide member 44a and clamping screw 45a, analogous to the members 44 and 45 described in connection with my frame holder supporting horizontal member 47) with means such as an arm 81. This arm is adapted, when the light 25 is swung from an inoperative into the operative position in which it is shown, to depress a cooperating arm 82,—which may be pivoted, as at 83, to the mirror 24, and may be provided with means, such as a tension spring 84, tending to hold the mirror 24 in an upper or operative position except when the arm 82 is engaged and depressed by the arm 81.

The carriage 27 is shown as provided with means, including a laterally adjustable member 85, provided with a clamp screw 86 and receiving a vertically adjustable member 87 (which is in turn provided with a clamp screw 88) by which the lens 26 may be so positioned, relatively to the carriage 27, as to be disposed coaxially with the optical systems of one or both of the described cameras, as during the light-impressing of the feature or features 78 upon the undeveloped film carried by camera 11.

When I use the camera 11 to handle an undeveloped but light-impressed film (as by passing the same from reel housing 14 to reel housing 16) in conjunction with an immediately superimposed mat film (as a corresponding developed negative, passing from within the reel housing 13 to the reel housing 15) synchronously advancing a mere control or guidance film (such as a print obtained from the mentioned developed negative as from reel housing 21 of skeleton camera 12 toward reel housing 22 thereof) it will be understood that, assuming both of the mentioned cameras to be suitably adjusted and focused upon the "feature" or "features" supported by the intermediate frame holder 23, or its equivalent, the character of the latent images which are brought successively into position in the camera 11 being always accurately indicated by a corresponding observation made upon the film in skeleton camera 12, a beam, reflected by the mirror 24, from the light 79, may be utilized in projecting a feature or features displayed by a frame or frames adjustably secured within the frame holder 23, so that the operator, by so adjusting the frame or frames as to show the feature or features thereof in a desired position upon the print or other film in skeleton camera 12, may be assured as to the position in which said feature or features will be light-impressed, by the positioning of the light 25 and lens 26 in their operative position and the opening of the shutter of camera 11, upon the undeveloped film in camera 11,—the superimposed developed negative, when employed, being effective as a mat, to avoid any confusion of light effects.

As an alternative, it will be appreciated that the film carried from reel housing 14 to reel housing 16 may be an unexposed or entirely raw sensitized film; and the film carried from reel housing 13 to reel housing 15 may be either a print or a mat or another raw sensitized film; and the feature or features upon the frame or frames in the frame holder 23, whether produced photographically or manually or otherwise, may be either in the form of light-transmitting areas in a relatively or entirely opaque surface or in the form of opaque areas in a relatively or entirely transparent surface.

As a further alternative, using an undeveloped but light-impressed sensitized film in camera 11, the frame holder 23 may be used to support and adjust a suitable mat; and a control film of the general character mentioned may be synchronously advanced through the camera 12, or the camera 12 can be, as intimated, used in the handling of a mat film (whether an ordinary developed negative, an overdeveloped or "reversed" negative, or a print) and desired feature picture being supported by the frame holder 23, and light being transmitted, as from an additional and coaxial light 89 (shown as provided with a parabolic mirror 90) through both the mentioned mat film and the mentioned frame, the alternative light 25 being, in this case, unused, and the light 79 being, in any case, used only in ascertaining and adjusting the position of the feature 78, or its equivalent, within the respective frames of the film or films handled by the camera 11.

The rotative adjustment of either or both of the mentioned cameras or the frame holder 23 may be utilized either in compensating for any inaccuracy in the levelling of a motion picture camera (such as, for example, a camera of the character disclosed in my last mentioned copending application) during the first exposure of a film or films, such as the film or films handled by the camera 11; or in specially orienting the feature or features displayed by the frame or frames in frame holder 23 (whether or not this is also provided with means, not shown, for synchronously advancing a strip of film) as for the production of topsy-turvy or mystifying apparent motions of any desired character; and variations in the distance between the cameras 11 and 12 may be rendered ineffective to interfere with the synchronization of the advance of films therethrough, as by providing a splined connection between one of the worms (18, 19) on the shaft 17—means such as a set screw 91 being employed to retain one or both of said worms in any desired position of longitudinal adjustment.

Using means and methods of the general character described, it will be obvious that a suitably trained operative, having brought the respective cameras into coaxial relationship and focused the same upon the frame or frames in frame holder 23, may first utilize light 79, or its equivalent, in adjusting the said frame, by observing the image of the feature thereon upon the film in camera 12, then swinging the carriage 27, provided with light 25 and lens 26, into its operative position (and automatically withdrawing the mirror 24 into an inoperative position) whereupon the opening of the shutter of camera 11 will light-impress the feature or features of the frame or frames in frame holder 23 upon the undeveloped film in camera 11. The crank 20 may then be rotated to bring other corresponding frames of the films advancing within cameras 11 and 12 into position; the frame or frames in frame holder 23 may be readjusted to any extent required; and the described operations may be repeated, at a comparatively rapid rate, throughout the entire length of a roll of film; and I may mention, in conclusion, that when any color-selective effects are desired, the lens 26, or its equivalent, instead of being formed of colored glass, may advantageously be provided with a separate color screen, such as, for example, a color screen 92, shown as pivotally movable, upon a post 93, relatively to a circular holder 94 for said lens,—means such as a clamping nut 95 being preferably provided, to hold the screen 92 either in an operative position, in front of said lens, or in an inoperative position above or at one side of the same.

Although I have herein described a single complete apparatus for use in the practice of my invention in any one of several alternative modes, it should be understood that various features of both my apparatus and my process might be independently employed, and also that various modifications of both my apparatus and my processes, might be devised, by those skilled in the art to which this case relates, without the slightest departure from the spirit and scope of my invention, as the same is indicated above and in the following claims.

I claim as my invention:

1. A method of producing trick motion picture films which includes: disposing film handling cameras in focus with a frame which carries a feature to be light impressed upon an exposed but undeveloped film; placing an exposed but undeveloped film in one of said cameras; similarly placing an identically exposed and developed control film carrying an image in the other of said cameras, said last mentioned camera being arranged for observing the film therein; adjusting said films to have similar optical relation relative to the respective lenses of said cameras; projecting the image of a feature carried by said frame upon said control film; adjusting said frame to locate said projected image relative to the image on said control film; and light impressing said feature upon said undeveloped film.

2. A process of the general character defined in claim 1 in which a mat film is advanced synchronously with said undeveloped film.

3. A process of the general character defined in claim 1 in which said first mentioned film is initially provided with latent images corresponding with pictures upon the mentioned control film; and in which corresponding pictures are used as mats during the mentioned light-impressing upon said undeveloped film, of features displayed by said frame.

4. A process of the general character defined in claim 1 in which said first mentioned film is advanced between successive light impressions of the mentioned feature thereon, in contact with a film bearing pictures.

5. A process of the general character defined in claim 1 in which said first mentioned film is initially provided with latent images corresponding with pictures upon the mentioned control film; and in which a mat film is advanced synchronously with said undeveloped film; and in which said films are synchronously advanced, between light impressions of the mentioned feature, upon said undeveloped film.

6. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon; and means for rendering said feature momentarily visible on said control film.

7. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon, and means for so projecting said feature upon said control film as to indicate the position in which an image thereof will be light impressed upon said unexposed film.

8. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon and means for projecting images of said feature alternatively on each of said films.

9. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom embodying means for supporting and advancing an identically exposed control film carrying pictures corresponding with said latent images; and interposed light means for photographically impressing said undeveloped film with a feature not previously light impressed thereon; means for projecting images of said feature alternatively on said undeveloped film; and means for rendering the positioning of one source of light effective to discontinue the propagation of light in an opposite direction.

10. In an organization of the general character described: a camera organization adapted for light impressing a film; means for supporting in and advancing through said camera an exposed but undeveloped film carrying latent images; means for protecting the latent images upon said film; control means, disposed oppositely with said camera, and spaced therefrom, embodying means for supporting and advancing an identically exposed and developed control film carrying pictures corresponding with said latent images; interposed means for photographically impressing said undeveloped film with a feature not previously light impressed thereon; means for rendering said feature momentarily visible on said control film; and means for synchronously advancing said films.

11. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; interposed means for photographically impressing said undeveloped film with a feature not previously light impressed thereon; means for rendering said feature momentarily visible on said control film; and means enabling said cameras to be independently focused and adjusted relatively to said interposed means.

12. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; interposed means for photographically impressing said undeveloped film with a feature not previously light impressed thereon; means for rendering said feature momentarily visible on said control film; and means for rotatively adjusting said interposed means to vary the location of the image of said feature upon the individual frames of said undeveloped film.

13. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; interposed means for photographically impressing said undeveloped film with a feature not previously light impressed thereon; means for rendering said feature momentarily visible on said control film; and means for rotatively adjusting said interposed means about the optical axis of said camera.

14. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom embodying means for supporting and advancing an identically exposed control film carrying pictures corresponding with said latent images; interposed means for photographically impressing said undeveloped film with a feature not previously light impressed thereon; means for rendering said feature momentarily visible on said control film; and means for adjusting said interposed means in a plurality of directions in a plane perpendicular to an optical axis common to said camera.

15. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon, said interposed means including a frame in a frame holder and means for projecting a beam of light through said frame, during the adjustment thereof by observation of an image on said control film.

16. In an organization of the general character described: a camera organization adapted for light impressing a film; means for supporting in and advancing through said camera an exposed but undeveloped film carrying latent images; means for protecting the latent images upon said film; control means; disposed oppositely with said camera and spaced therefrom, embodying means for supporting and advancing an identically exposed control film carrying pictures corresponding with said latent images; and interposed means for photographically impressing said undeveloped film with a feature not previously light impressed thereon, said interposed means including a frame in a frame holder, means for projecting a beam of light through said frame during the adjustment thereof by observation of an image on said control film, and means for subsequently projecting a beam of light in an opposite direction, through said frame and onto said undeveloped film.

17. In an organization of the general character described: a camera organization adapted for light impressing a film; means for supporting in advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon, said interposed means including a frame in a frame holder, means for projecting a beam of light through said frame during the adjustment thereof by observation of an image on said control film, and means for subsequently projecting a beam of light in an opposite direction through said film and onto said undeveloped film, the positioning of said last mentioned projecting means being automatically effective to render said first mentioned projecting means ineffective.

18. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with said latent images; and interposed means for photographically impressing said undeveloped film with a feature not previously light impressed thereon, said interposed means including a frame in a frame holder; means for projecting a beam of light through said frame during the adjustment thereof by observation of an image on said control film; means for subsequently projecting a beam of light in an opposite direction, through said frame and onto said undeveloped film; the removal of said mentioned projecting means being effective to restore said first mentioned projecting means.

19. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film, and means for projecting an image of said feature upon said undeveloped film.

20. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a lens in said frame holder; a frame, carrying a feature to be photographically impressed upon said undeveloped film, mounted in said frame holder; means for projecting an image of the feature in said frame upon said control film, and means for projecting the image of said feature upon said undeveloped film.

21. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film, and means for projecting the image of said feature upon said undeveloped film, said frame holder being adjustably movable parallel with the optical axis of said cameras.

22. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film, and means for projecting the image of said feature upon said undeveloped film, said frame holder being provided with means for moving said frame in a plane at right angles to the optical axis of said cameras.

23. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film; means for projecting the image of said feature upon said undeveloped film, and means for moving said frame in either of two directions at right angles to each other and in a plane at right angles to the optical axis of said cameras.

24. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film; means for projecting the image of said feature upon said undeveloped film, and means associated with said frame holder for rotatably adjusting said frame.

25. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film, and means for projecting the image of said feature upon said undeveloped film, one of said cameras being adapted for rotation about its optical axis.

26. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film, and means for projecting the image of said feature upon said undeveloped film, said cameras being adapted for rotation about a common optical axis.

27. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; means for projecting an image of the feature in said frame upon said control film; means for projecting the image of said feature upon said undeveloped film, and precision means for adjusting the distance between said cameras.

28. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; an adjustable mirror for optionally projecting the image of the feature in said frame upon said control film; and means for projecting the image of said feature upon said undeveloped film.

29. In an apparatus of the general character described: a camera provided with means for advancing an undeveloped film; a second camera disposed oppositely thereto and provided with cooperative means for advancing a control film synchronously with said undeveloped film, said last mentioned camera being arranged for viewing said control film; a frame holder interposed between said cameras; a frame, carrying a feature to be photographically impressed upon said undeveloped film, mounted in said frame holder; an adjustable mirror associated with said frame holder for reflecting a beam of light through said frame into one of said cameras; and means for projecting the image of said feature upon said undeveloped film.

30. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with the latent images; a frame carrying a feature not previously light impressed on said undeveloped film, interposed between said cameras; a source of light and a lens removably interposed on one side of said frame; and a mirror removably interposed on the opposite side of said frame.

31. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with the latent images; a frame carrying a feature not previously light impressed on said undeveloped film, interposed between said cameras; a source of light and a lens removably interposed on the one side of said frame; and a mirror removably interposed on the opposite side of said frame, said mirror and said light source being interconnected so that the movement of one into operative position renders the other inoperative.

32. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with the latent images; a frame carrying a feature not previously light impressed on said undeveloped film, interposed between said camera; a source of light and a lens removably interposed on one side of said frame; means for adjustably positioning said lens to render same coaxial with the optical systems of said cameras for projecting an image of said frame carried feature upon said undeveloped film; and a mirror removably interposed on the opposite side of said frame.

33. In an organization of the general character described: a camera organization adapted for light impressing a film; means for supporting in and advancing through said camera an exposed but undeveloped film carrying latent images; means for protecting the latent images upon said film; control means, disposed oppositely with said camera and spaced therefrom, embodying means for supporting and advancing an identically exposed control film carrying pictures corresponding with the latent images; a frame carrying a feature not previously light impressed on said undeveloped film, interposed between said cameras; a source of light and a lens removably interposed on one side of said frame; a color screen interposed between said frame and said second mentioned camera; and a mirror removably interposed on the opposite side of said frame.

34. In an apparatus of the general character described: a camera provided with means for advancing an undeveloped film; a second camera disposed oppositely thereto, provided with cooperative means for advancing a control film synchrononsly with said undeveloped film, said second camera being arranged for viewing said control film; a frame holder provided with a lens interposed between said cameras in a plane which is substantially normal to the optical axis of said cameras; a supported frame mounted in said frame holder; means for successively projecting light through said frame onto said control film and onto said undeveloped film; means for rotating said supported frame in said normal plane; means for moving said frame horizontally; and means for moving said frame vertically in said normal plane.

35. In an apparatus of the general character described: a camera provided with means for advancing an undeveloped film; a second camera disposed oppositely thereto, provided with cooperative means for advancing a control film synchronously with said undeveloped film, said second camera being arranged for viewing said control film; a frame holder provided with a lens interposed between said cameras in a plane which is substantially normal to the optical axis of said camera; a supported frame mounted in said frame holder; means for successively projecting light through said frame onto said control film and onto said undeveloped film; means for rotating said supported frame in said normal plane; means for moving said frame horizontally; means for moving said frame vertically in said normal plane; and means for inclining said frame holder in a plane angularly disposed with said normal plane.

In testimony whereof, I have hereunto set my hand at Los Angeles, California, this 12th day of April, 1926.

MAX HANDSCHIEGL.